Figure 1:
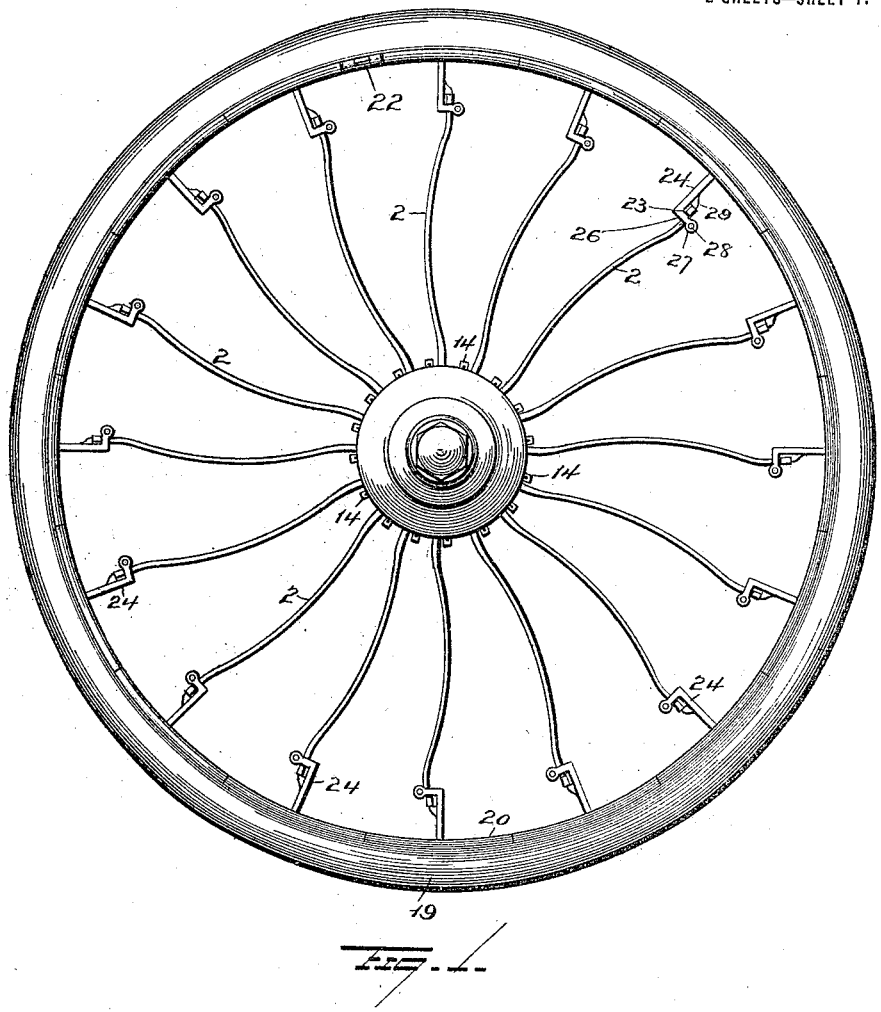

O. L. HARRISON.
RESILIENT WHEEL.
APPLICATION FILED MAY 18, 1914.

1,194,175.

Patented Aug. 8, 1916.
2 SHEETS—SHEET 1.

WITNESSES

INVENTOR
O. L. Harrison
Attorney

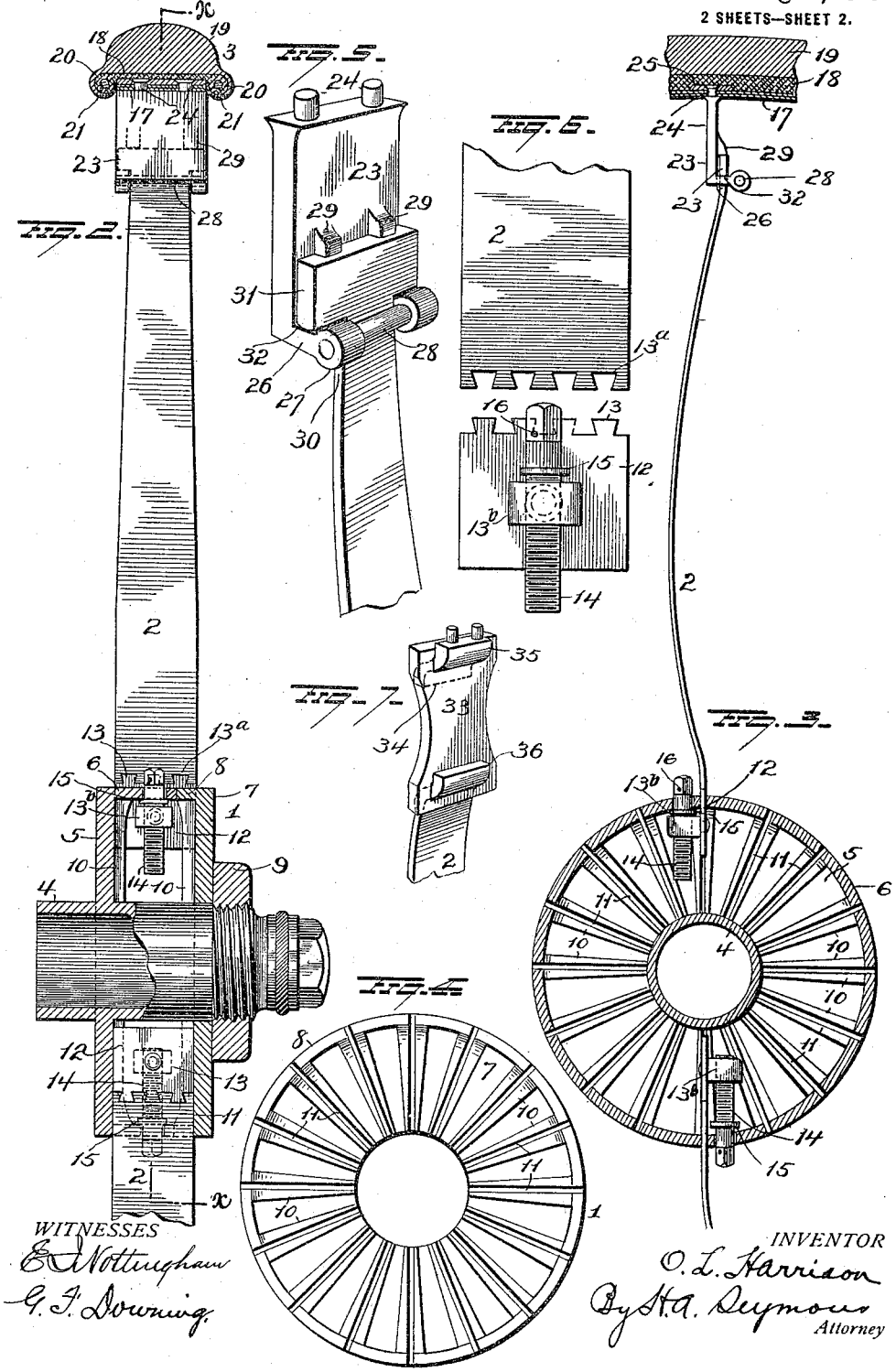

UNITED STATES PATENT OFFICE.

OWEN L. HARRISON, OF COLETA, ILLINOIS.

RESILIENT WHEEL.

1,194,175. Specification of Letters Patent. Patented Aug. 8, 1916.

Application filed May 18, 1914. Serial No. 839,392.

*To all whom it may concern:*

Be it known that I, OWEN L. HARRISON, of Coleta, in the county of Whiteside and State of Illinois, have invented certain new and useful Improvements in Resilient Wheels; and I do hereby declare the following to be a full, clear, and exact description of the invention, such as will enable others skilled in the art to which it appertains to make and use the same.

This invention relates to improvements in resilient wheels,—one object of the invention being to so construct a wheel having a resilient rim that the latter will be free to be depressed toward the hub, but in which the lateral bulging of said rim will be restricted to a minimum.

A further object is to provide means in a wheel having a resilient rim which will operate to hold said resilient rim against large outward movement,—at the same time permitting said rim to be depressed, whereby the maximum depression of the rim at the center of depression will be many times greater than the maximum bulges adjacent to said depression.

With these and other objects in view, the invention consists in certain novel features of construction and combinations of parts as hereinafter set forth and pointed out in the claims.

In the accompanying drawings; Figure 1 is a side elevation of a wheel embodying my improvements; Fig. 2 is an enlarged transverse sectional view; Fig. 3 is a sectional view on the line x—x of Fig. 2; Fig. 4 is a view in elevation of the inner face of the ring or disk; Fig. 5 is a perspective view illustrating the connecting devices between a spoke and the rim; Fig. 6 is a face view showing the connecting devices for a spoke with the hub, and Fig. 7 is a view in perspective showing a modification of connecting devices between a spoke and the rim.

1 represents the hub of the wheel; 2 the spokes which are made of flat spring steel and nearly straight when under tension, and 3 indicates the tire portion, all as hereinafter more specifically described.

The hub comprises a central body portion 4, (preferably hollow or tubular in form), provided with an integral disk or collar 5 having an inwardly projecting flange 6 at its peripheral edge. A collar or disk 7 is mounted on the central body portion 4 and is provided at its peripheral edge with an inwardly projecting flange 8 which abuts against the inner edge of the flange 6,—said disk or collar 7 being retained in place by means of a nut 9 screwed onto the central body portion 4.

The disks 5 and 7 are provided on their inner faces with pairs of radial ribs 10 forming annular series of radial grooves 11 which extend through the peripheral flanges 6—8 of said disks. The disk 7 is so disposed that the radial grooves thereof will be directly opposite the radial grooves of the disk 5, the radial grooves of the respective disks serving as guides to receive connector plates 12 for the spokes 2. Each plate 12 is provided at its outer end with dove-tail lugs 13 to enter similarly shaped notches 13ª at the inner end of a spoke, thus forming an efficient connection between the plate and the spoke. Each connector plate is provided with a lug 13ᵇ having a threaded opening for the passage of a screw 14,—the outer portion of which latter passes freely through a hole in the peripheral flange 6 of the disk 5. Each screw 14 is provided with an annular flange or collar 15 to bear against the inner face of the flange 6 and the free outer end portions of the screws which project beyond the flange 6 are made angular to receive a suitable tool for operating the same to adjust or tighten the spokes. In order to prevent the angular outer ends of the adjusting screws 14 from becoming disposed inwardly past the flanges 6 of disk 5 before the spokes are assembled, pins may be passed through transverse holes 16 in said adjusting screws.

After the spokes have been attached to the connecting plates 12 (and also connected with the tire portion of the wheel as hereinafter explained), the connector plates will be drawn inwardly between the disks 5—7 by operation of the adjusting screws 14, and when the parts are in their normal operative positions, the joints between the connector plates and spokes will be located between said disks as shown in the lower portions of Figs. 2 and 3, and the bowed spring spokes will then be under tension and nearly straight.

The tire portion 3 of the wheel comprises a resilient rim 17, made preferably of laminated sheet steel and embraced by a fabric member 18, to which latter a rubber tread portion 19 is applied. The fabric member is provided at its respective side edges with tubular enlargements 20 (preferably cut or notched at intervals as shown in Fig. 1), and through said tubular enlargements, flexible devices 21, (preferably wire cables, each comprising a plurality of strands) are passed. Each wire cable is provided at its respective ends with threaded extensions which may be formed by welding the strands (at the ends thereof) into solid masses and then threading them and these threaded ends enter a turn buckle 22. When the fabric and rubber portions of the tire are first applied to the flexible rim, the notches of the tubular enlargements at the sides of the fabric member will be open, but as the cables are tightened by operation of the turn-buckles to clamp the fabric member on the rim, said notches will be closed.

To insure efficiency in the performance of the functions which are attained by my improvements, it is important that the connections of the spring spokes with the tire member shall not be permanently rigid, but that such connections shall be capable of yielding. In effecting such connections between the spokes and the tire portion, I prefer to employ a plurality of blocks or links 23 (one for each spoke) and rivet the same (equally spaced apart) to the flexible rim 17, for which purpose, each block is made at its upper end with studs 24 passing through holes in the rim and through plates 25 located on the outer face of the rim, said plates being countersunk around the holes to receive the upset ends of the studs. Each block or link 23 is provided at its lower end with two shoulders 26 having perforated bosses 27 at their free ends to receive a transverse pin 28. Each block or link is also provided on one face a distance above the shoulders 26, with lugs 29. The outer end portion of each spoke 2 is contracted as at 30 and at the outer end of said contracted portion, a cross head 31 is provided. By removing the transverse pin 28, the contracted outer portion of the spoke may be passed between the shoulders 26 and the head 31 disposed between the lugs 29 and the shoulders 26,—the portions of the cross head which rest upon said shoulders being rounded as indicated at 32.

The spokes, being wide and thin, present great resistance to lateral pressure, because they stand nearly straight, and while the rim is free to be depressed at any point, only very slight movement away from the hub is possible, because an arc of very small curvature is not appreciably lengthened by being drawn out. Each spoke before being placed in the wheel has a definite curvature which may be nearly all eliminated by means of the set screws 14. The rim can not be depressed without slightly lengthening the spokes adjacent to the point of depression. Therefore, the nearer the spokes stand to straight, the less depression will be possible, and vice versa. Also the more tension the spokes have, the greater load the wheel will carry. When pressure comes on the wheel laterally the thrust will be resisted by all the spokes. Since the load is suspended on the spokes, (not supported), they make use of their tensile strength, which is many times greater than their strength to support a load which would tend to bend them. Therefore, the spokes may be thin, making a light wheel and the tension of said spokes is very great, which greatly increases their lateral resistance.

Ordinarily the maximum depression of the rim should not be less than about two inches and the spokes cannot accommodate such a depression directly because it would unduly bow them. It is practicable however to permit the spokes to compensate for a depression of about three-fourths of an inch and if the depression does not exceed this, the heads 31 of the spokes will maintain their bearing upon the shoulders 26 of the blocks or links 23. Should a greater depression occur, the same would be accommodated by the sliding of the spoke past the lugs 29,—the bowing of the spoke being then sufficient to move the head 31 outwardly beyond the lugs 29. However, it would seldom happen that a depression greater than three-fourths of an inch would occur. It will be understood that when a spoke is in normal position, its head rests under the lugs 29 and twisting the rim is prevented under lateral strain, but when a depression occurs the head of the spoke will move and be released from the lugs 29, so that if a great depression occurs the spoke will be forced to slide. The headed outer end of the spoke will always be released before it is necessary for it to slide.

With the use of my improvements; while the spring spokes are under tension, a depression bends them only slightly more, and it is difficult to break a curved spring by drawing it straight, since it cannot be strained beyond a given point. When once straight, further strain is resisted by the full tensile strength of the spring, which is many times greater than the spring tension.

In the modification shown in Fig. 7, the blocks or links are movably connected both with the rim and the spoke. In this construction, a block or link 33 is provided near its upper end with a slot, through which the curved lip 34 of a lug 35 freely passes, said lug being riveted to the rim. The block or link 33 thus loosely connected with the rim, is provided near its lower end with a slot through which a curved lip 36 at the upper end of the spoke 2 loosely passes.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. A wheel comprising a hub, a resilient rim free to be depressed at any point, blocks rigidly secured to said rim, slightly bowed spring spokes connected with the hub, and connections between the outer ends of said spokes and the fixed blocks, whereby the spokes will be retained under tension, said connections constructed to permit longitudinal play of the spokes when considerable depression in the rim occurs.

2. In a wheel, the combination with a hub and a resilient rim free to be depressed at any point, of blocks secured to said rim, and spring spokes secured to the hub and having pivotal and also sliding connections with said blocks.

3. In a wheel, the combination with a hub, of a resilient rim free to be depressed at any point, blocks secured to and projecting inwardly therefrom, said blocks having spaced shoulders projecting laterally therefrom and also having laterally projecting lugs above said shoulders, and spring spokes secured to the hub and having heads at their outer ends normally resting upon the shoulders of the block and under the lugs on the latter.

4. In a wheel, the combination with a hub, of a resilient rim free to be depressed at any point, blocks secured to and projecting inwardly from said rim, said block having spaced shoulders projecting laterally therefrom and also having laterally projecting lugs above said shoulders, spring spokes secured to the hub and having contracted outer end portions entering between the shoulders of the block, heads on said contracted portions of the spokes and normally resting on the shoulders of the blocks and under the lugs on said blocks, and removable pins connecting said shoulders.

5. In a wheel, the combination of a resilient rim, a hub comprising flanged disks having radial grooves, sheet spring spokes connected with the resilient rim, connector plates movable in the radial grooves of the hub disks and removably connected with the spokes, each connector plate having a lug, a screw threaded through each lug and projecting freely through the flange of one of the hub disks, and collars on said screws to engage the inner face of said flange.

6. In a wheel, the combination with a rim and a hub, the latter comprising spaced disks having radial grooves and also having peripheral flanges, of spring spokes connected with the rim, connector plates movable in the radial grooves of the hub disks and having removable dove-tail connection with the inner ends of the spring spokes, lugs on said connector plates, screws threaded through said lugs and passing freely through the peripheral flange of one hub disk, and collars on said screws to engage said peripheral flange.

In testimony whereof, I have signed this specification in the presence of two subscribing witnesses.

OWEN L. HARRISON.

Witnesses:
  B. H. KLINE,
  ANNA M. KLINE.

Copies of this patent may be obtained for five cents each, by addressing the "Commissioner of Patents, Washington, D. C."